T. WILLIAMS.
ROTARY SPADER.
APPLICATION FILED JAN. 20, 1916.
1,271,818.
Patented July 9, 1918.
2 SHEETS—SHEET 1.
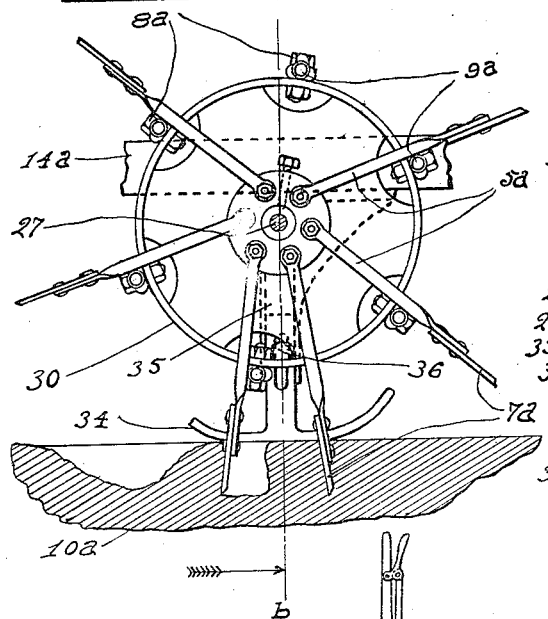
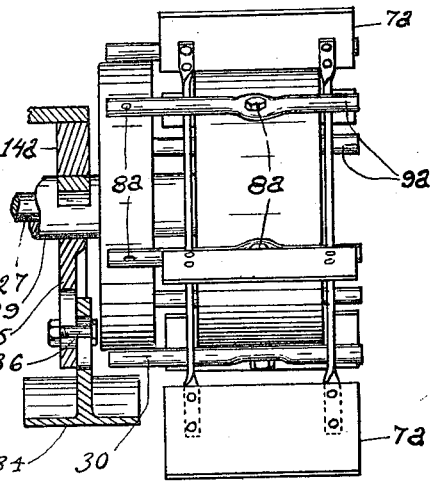
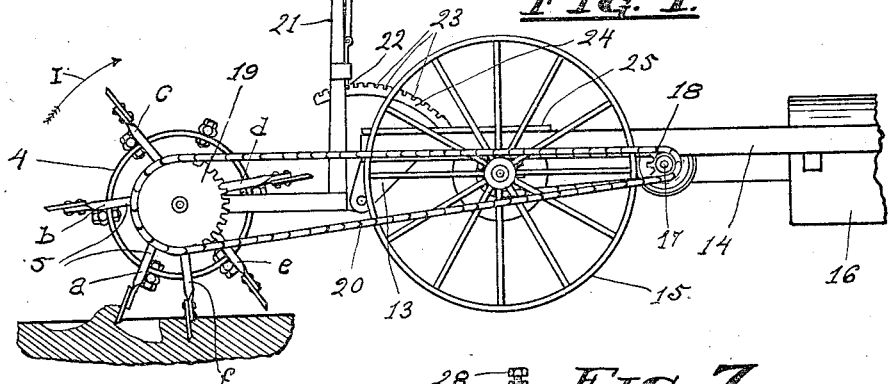
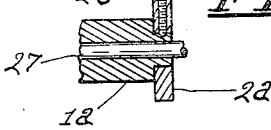
Witnesses
John P. Schwartz
Gus. Saunders.
Inventor
Tom Williams,
By W. F. Davis & Son
Attorneys

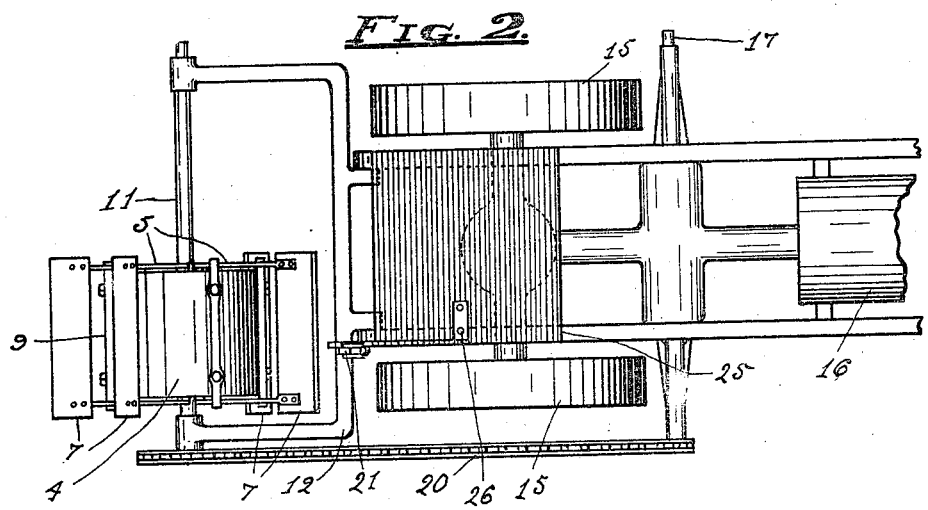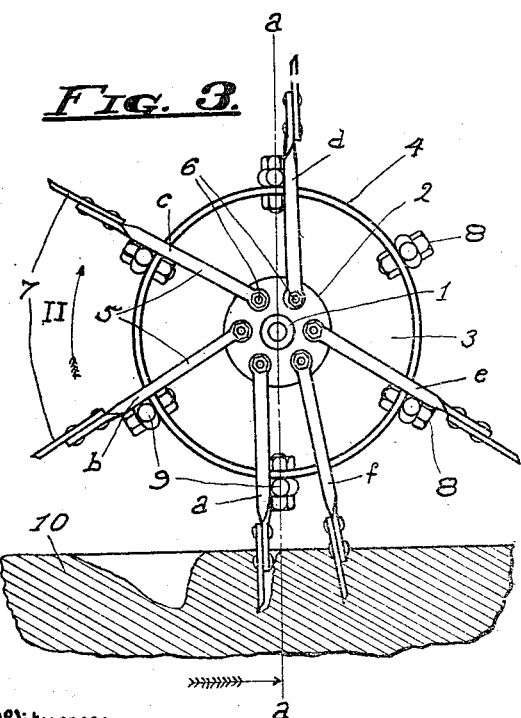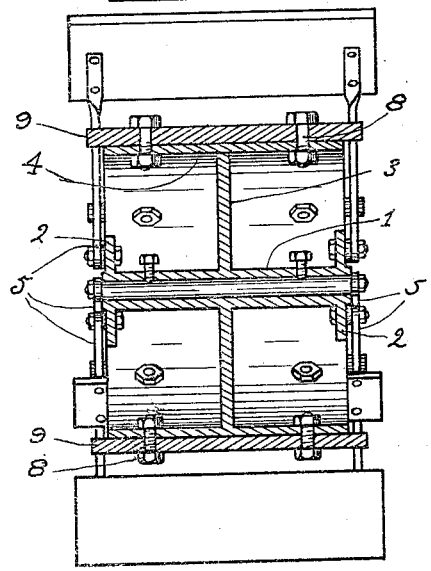

UNITED STATES PATENT OFFICE.

TOM WILLIAMS, OF MARYSVILLE, KANSAS.

ROTARY SPADER.

1,271,818.      Specification of Letters Patent.      Patented July 9, 1918.

Application filed January 20, 1916. Serial No. 73,145.

*To all whom it may concern:*

Be it known that I, TOM WILLIAMS, a citizen of the United States, residing at Marysville, in the county of Marshall and State of Kansas, have invented certain new and useful Improvements in Rotary Spaders, of which the following is a full, clear, and exact description, such as will enable others skilled in the art to which it appertains to make and use the same.

The invention relates to spading mechanism for tilling soil and seeks to provide a simple and efficient form of spading mechanism which may be employed as a driving wheel to propel traction engines, farm tractors, power driven trucks and the like.

In field farming as generally followed, soil is tilled, and growing grain and plants cultivated by various forms of plows and cultivating implements which invariably must be drawn through the soil, the farm tractor being generally employed for this service. The difficulty encountered in driving the ordinary tractor over the soft soil of fields is well known, as is also the power required to draw the ordinary plow, the tractor wheels often burrowing into the soil and failing to advance the tractor; it is also well known that soil stirred with the spade is more thoroughly pulverized, and that it will produce a greater yield than that stirred with the plow, but heretofore no satisfactory and economical mechanism has been devised whereby the spading action could be produced on a large scale with the aid of a tractor or other means of propulsion. To overcome and remove these difficulties it is essential to provide a spading mechanism that can be removably mounted on the ordinary tractor driving shaft or wheel, whereby the mechanism will not only not retard the movement of the tractor, but it will materially aid the wheels in their driving effect.

The present invention seeks to provide an improved spading mechanism which may be directly mounted on the driving shaft, or driving wheel or wheels of the ordinary farm tractor, or power driven truck, for tilling soil preparatory to planting, and between rows of growing grain and plants.

A further object of the invention is to so construct and mount the spading mechanism as to materially reduce the tractive force usually required to propel the tractor and stir an equal quantity of soil as plows and other well known means.

A still further object of the invention is to so construct the mechanism that it will operate equally well in reverse directions so as to avoid the usual turning of the tractor at the end of a field.

A still further object of the invention is to so construct the mechanism as to employ the weight of the tractor to cut the soil instead of consuming the draft force as does the ordinary plow.

A still further object of the invention is to so construct the mechanism that it may be employed as the driving wheel, or wheels of the tractor.

A still further object of the invention is to so construct the mechanism as to prevent slippage thereof when employed as, or in connection with the driving wheel, or wheels of a tractor.

With these and other objects in view the invention consists in the improved features of construction, adaptability, manipulation, shapes, combinations and arrangements of parts hereinafter set forth and more particularly pointed out in the appended claims, an application of the improvements being illustrated in the accompanying drawings, in which:

Figure 1 is a view in elevation of the improved spading mechanism and a fragmentary view of a tractor to which the mechanism is attached and employed as a propelling wheel, as well as for tilling soil.

Fig. 2 is a plan view of the spading mechanism illustrating the same attachment as that shown in Fig. 1.

Fig. 3 is an enlarged view in elevation of the improved spading mechanism.

Fig. 4 is an enlarged sectional view of the mechanism, taken on line *a—a* of Fig. 3.

Fig. 5 is an enlarged view in elevation of the mechanism attached to the ordinary driving wheel of a tractor.

Fig. 6 is an enlarged sectional view of the mechanism attached to the driving wheel of an ordinary tractor, the view of the supporting mechanism being taken on line *b—b* of Fig. 5.

Fig. 7 is an enlarged fragmentary sectional view taken on line *b—b* of Fig. 5.

The mechanism frame as shown comprises the hub 1, flanges 2, web 3 and rim 4, in form similar to the ordinary belt pulley wheel, it is obvious however that the construction and shape of this frame may be varied through wide range without departure from the essentials of the invention.

The arms 5 are pivoted to the flanges 2 at 6 and extend outward diametrically beyond the rim 4, the arms being connected in pairs by the blade shaped spades 7 so that the spades always project outward from the rim, there being but six spades and six pairs of arms shown in the drawings, the number of spades and arms however may be increased or diminished to meet the desires or requirements of any demands, by the ordinary mechanic, without invention.

To the rim 4 are secured by bolts 8 the spade driving bars 9, each pair of arms 5 being free to play between the adjacent pair of bars, so that on both the rising and lowering sides of the rim 4 as the mechanism revolves, the arms will all rest by gravity against the bars, each pair of arms falling forward in the direction of rotation on reaching the extreme upward position, from one bar 9 to the adjacent bar 9.

In Figs. 1 and 2 the rotary spader is mounted on the shaft 11, which is journaled in the swinging frame 12, the latter being pivoted to the downward projecting portions 13 of the tractor frame 14, the tractor being shown in fragmentary view and merely to illustrate an application of the spading mechanism thereto. In this connection the shaft becomes the driving axle or shaft of the tractor, the wheels 15 being employed merely to aid in supporting the weight of the tractor, it being understood that any upward force resulting from the thrusting of the spades 7 into the soil will relieve the weight that would otherwise rest on the wheels 15, the spading mechanism in this application preferably serving as the driving wheel of the tractor.

The engine 16 is arranged to drive the shaft 17 by common and well known connections, the shaft having mounted thereon the sprocket wheel 18 from which the chain 20 drives the sprocket wheel 19, the latter being rigidly secured to the driving axle or shaft 11, the spading mechanism being secured to the shaft in any usual manner.

It will be noticed that the spades 7 reach but about one half the distance of the inside span of the frame 12, it being understood that duplicate mechanisms may be mounted on the shaft, and that the spading mechanism may be constructed of any desired width, it being desirable in cultivating growing grain and plants to employ several mechanisms of narrow width so as to till the soil between rows of growing grain and plants; while in tilling the soil preparatory to planting it is desirable to employ a mechanism of considerable cutting width or several mechanisms arranged close together so as to till all the soil in as wide a path as practical, it is understood however that two strips of soil may be tilled at one time by the duplication of mechanisms and the strip left between may be tilled on the return trip by one or the other of the duplicate mechanisms.

The lever 21 is rigid with the frame 12 and is provided with the latch 22 positioned to engage the teeth 23 of the latch bar 24, the latter being secured to the deck of the tractor by the bolts 26 which pass through the bar and the deck 25. The lever is for the purpose of regulating the depth of the cut of the spades 7 in the soil so that the soil may be spaded to any desired depth, it being the custom to till soil to a greater depth for planting than for cultivating growing grain and plants.

In Figs. 5 and 6 the spading mechanism is shown connected directly to the driving wheel 30 of the tractor, the tractor being of common and well known construction, and shown only in fragmentary view. In these views the driving shaft is journaled in the usual housing 29, the latter being secured in usual manner to the tractor frame 14ª, the construction of the arms 5ª and spades 7ª being the same as that of those hereinbefore described, the bolts 8ª securing the arms 9ª to the mechanism frame which is the same as that hereinbefore described, and to the tractor wheels 30.

In this connection the wheels 30 are lifted from the surface of the soil and the depth of the cut of the spades 7ª are regulated by the shoes 34 which are adjustably secured to the arms 35 by the bolts 36, the arms and the shoes being slotted for the purpose of adjusting the distance of the shoes from the driving shaft 27, and the arms 35 being secured to the housing 29 in any usual manner. The shoes and the spades may be removed when the wheels 30 are employed as usual for driving the tractor, the operation of the spading mechanism of this application being the same as that of the construction and application hereinbefore described.

In operation the spading mechanism is employed to drive the tractor as well as to till the soil, the spades successively entering the soil and gaining a hold therein that will drive the tractor in soft soil where the usual wheel would fail to drive, while in hard or solid soil the weight of the tractor is employed to thrust the spades in to the soil and no loss of power is occasioned thereby, the mechanism operating in one direction of travel as well as the opposite which avoids the necessity of turning at the end of the field, as in operating plows and the like.

In Fig. 1 the bars 9 are driving the arms $a$, $b$ and $c$, the bars $d$ and $e$ lying forward on the corresponding bars, while in Fig. 3 the bars 9 are driving the arms *a*, *b*, *c* and *d* the arm *e* lying forward on the bar 9 in front thereof, the arm *f* in both views being in intermediate position, the arm *d* of Fig. 3 being in a position to fall by gravity forward upon the adjacent arm 9 on a slight advance of the mechanism, the latter being treated in these views as turning in the direction of the arrows I and II. As the mechanism is rotated each pair of the arms 5 will successively fall forward on reaching the uppermost position of the travel thereof and lie upon the corresponding bar 9, until the corresponding spade strikes the surface of the soil, when the bar 9 will leave the arms 5 and advance to the next pair of arms 5 in the direction of travel, it being understood that in the meantime the respective spade is cutting into the soil. When the bar 9 engages the arms in front thereof in the direction of rotation, the respective spade being in the soil will cause the mechanism and the tractor to advance, and as the mechanism is rotated still further the next succeeding bar 9 will engage the next succeeding pair of arms 5 and the preceding spade will be moved upward and rearwardly with respect to the direction of travel and the soil will be turned and pulverized and deposited in the space left by the last preceding spade.

From the foregoing it will be understood that the spades will cut and turn and pulverize the soil and leave it in a leveled condition, and that the hold of the spades in the soil will cause the mechanism and the tractor to advance at a speed somewhat slower than if the rim 4 were rolling upon the soil. It is obvious that an equal surface of soil can be tilled to a given depth with the spading mechanism, with a much less expenditure of power than can be accomplished with the tractor and an ordinary plow, that no extra power will be required to till hard or solid soil, and the spading mechanism can be operated in soft soil where the ordinary plow and tractor would be inoperative, and that numerous changes in the details as set forth may be made without departure from the essentials of the invention.

What I claim as new, and desire to secure by Letters Patent, is:—

1. In spading mechanism, a rotatably mounted wheel shaped frame, rods secured to said frame near the periphery thereof, the ends of said rods extending laterally beyond the edges of said frame and forming stops, pairs of arms pivoted to said frame near its axis and on opposite sides of said frame, said arms extending radially between the ends of said rods and swinging freely between them, and transversely positioned blade shaped elements secured to and carried by each pair of said arms.

2. In spading mechanism, a rotatably mounted wheel shaped frame, transverse stop members spaced around said frame near the periphery thereof, pairs of arms pivoted on opposite sides of the frame near its axis and extending radially between said stop members and swinging freely between them, and a transverse spade element carried by each pair of said arms.

In testimony whereof I affix my signature in the presence of two witnesses.

TOM WILLIAMS.

Witnesses:
 REBECCA JOFFEE,
 RUTH RUTGELL.

Copies of this patent may be obtained for five cents each, by addressing the "Commissioner of Patents, Washington, D. C."